Patented Oct. 18, 1938

2,133,273

UNITED STATES PATENT OFFICE 2,133,273

METHOD OF ALTERING THE SETTING TIME OF PECTIN

Raymond E. Cox, Corona, Calif., assignor to California Fruit Growers Exchange, Los Angeles, Calif., a corporation of California No Drawing. Application December 24, 1935, Serial No. 56,107

7 Claims. (Cl. 99—132)

This invention relates to the treatment of pectin, the primary purpose of the treatment being to change an inherent and fundamental characteristic thereof.

Pectin is utilized commercially in the manufacture of various products and the requirements differ for different trades and uses. Certain users require pectin with a uniformly slow setting rate while a pectin with a rapid setting rate is required for other uses.

Heretofore it has been difficult, if not impossible, for the pectin manufacturer to produce a pectin with a predetermined and uniform setting time. Different source materials and extraction methods produce pectins with differing and generally uncontrollable setting characteristics. There has been, therefore, a distinct need for some method whereby the setting time or setting rate of pectin can be controlled or modified.

This invention is based upon the discovery that it is possible to alter at will that inherent, intrinsic and fundamental characteristic of pectin, namely, setting time or its inherent ability to cause gelatin to proceed at a certain definite rate.

The setting time as used in this specification and in the appended claims refers to that interval of time which elapses between the instant all of the ingredients of the jelly batch, consisting of standard proportions of sugar, pectin, acid and total solids, are in solution and are in the final container (after suitable cooking or heating) and that instant at which gelation of the whole into a coherent mass can be observed.

Pectin may be said to occur in three distinct forms, namely, the naturally occurring form (in the form that it exists in the fruit, vegetable peel or other substance from which it can eventually be extracted), in extracted solid or precipitated state (such as the powdered pectin now on the market) and in the form of a sol. The methods of this invention are applicable to the treatment of pectin in all of these forms. The term "pectinous material" as used hereinafter refers to any one or more of these forms. The term "pectinous material in naturally occurring form" refers to the first of the three forms enumerated hereinabove. The term "pectin" as used hereinafter refers to that component, specifically, whose intrinsic setting time is modified by the processes hereinafter described.

Generally stated, the method of this invention comprises contacting the pectin (in any of the forms hereinabove referred to) with an alkaline reagent adapted to materially alter the intrinsic setting time of the pectin. The reagent is maintained in contact with the pectin for a considerable period of time, the time and temperature conditions being insufficient to destroy the gelation characteristics of the pectin and preferably insufficient to materially affect the texture of the gel which may subsequently be formed from such treated material, but sufficient, however, to produce an appreciable change in the setting time. Ordinarily, such change is an increase in the setting time interval. This change in setting time can be obtained by comparing the setting time of pectin extracted or treated in a normal manner with the setting time of the pectin extracted or treated in accordance with this invention.

As stated hereinabove, the reagent is normally alkaline and may be either liquid or gaseous, aqueous or anhydrous. For convenience in handling and application of the reagent, a liquid may be used as a carrier. The reagent or mixture of reagents and carriers should preferably not react with the pectin to degrade it appreciably, or in the event solid precipitated pectin is being treated, the reagent preferably should not hydrolyze the pectin.

One of the objects of the present invention, therefore, is to disclose and provide methods and means of changing or altering the setting time of pectin.

Another object is to provide methods and means of changing or altering the inherent setting time characteristics of pectin prior to extraction from its cellulosic source material by a treatment which involves the use of an alkaline reagent.

Another object is to disclose and provide methods and means whereby the setting time characteristics of pectins in solid or sol form may be altered by the use of an alkalized reagent.

Other objects, uses, advantages and adaptations of the invention will be apparent from the several illustrative forms of the invention described hereinafter.

The reagents preferably used in accordance with this invention are alkalies, bases or alkaline materials. For example, the reagents may include ammonia, ammonium acid carbonate, potassium hydroxide, and other inorganic alkaline materials or organic materials such as, for example, triethylamine, pyridine, triethanolamine, diethylamine, etc. If a liquid carrier is used, any one of a number of carriers may be employed; for example, ethyl alcohol or aqueous solutions thereof, benzene, methyl ethyl ketone, or other liquids containing the methyl radical, the acetyl radical or a saturated alkyl group, aliphatic and aromatic hydrocarbons and their derivatives such as the alcohols, ketones, aldehydes, amines, ethers and the aromatics of low molecular weight, such as benzol, may be employed. When solid pectin or solid substances containing pectin in naturally occurring forms are being treated, the liquid media should not exert an appreciable solvent or dispersing effect upon the pectinous material because of the mechanical difficulties involved in handling the mixtures when the pectin swells excessively. Some of the organic liquids (when miscible with water, as diethylene glycol, for example) may be diluted with water but the relative proportion of water should not be increased to such a point that any excessive hydration of the pectin takes place.

As stated hereinbefore, the invention contemplates contact of the pectin or pectin-bearing material with an alkaline reagent for an appreciable period of time. Ordinarily, the times of contact may vary from three or four hours to as many days, depending upon the increase in setting time desired. Storage at higher temperatures appears to magnify the retarding effect obtained. The following example illustrates a method of operation which may be employed in treating pectin in its naturally occurring form:

Dried lemon peel was prepared by extracting the juice from lemons by burring, the peel being then soaked in several changes of alcohol and dried. The dried pulp was then ground to about 15 mesh. A portion of the dried peel was then extracted in a solution acidulated with hydrochloric acid for the purpose of determining the characteristics of the pectin obtained from untreated peel. It was found that this pectin had a setting time of less than ten seconds.

Dried peel from the same batch was then subjected to alkaline treatment using concentrated (28% $NH_3$) ammonia as the reagent in 70% alcohol. The dried peel was covered by the alkalized alcohol and maintained for sixteen hours at a temperature of 25° C., in each case. When 5.0 ml. of ammonia was used in 500 ml. of 70% alcohol per 100 grams of peel under these conditions, the set of the pectin was retarded to 1 minute and 20 seconds.

The use of 5.5 ml. of ammonia under the same conditions retarded the set to 2 minutes. The use of 6.0 ml. of ammonia retarded the set to 4 minutes and 10 seconds. In each instance, however, the peel had been treated with the alkalized alcohol for the time and at the temperature indicated. The mixture of reagent and peel was neutralized, in each instance, by the addition of an amount of hydrochloric acid equal to the amount of ammonium hydroxide used, the reagent then being filtered off and the peel washed with alcohol and again dried. This treated, neutralized, washed and dried peel was then extracted in a normal manner, the extraction liquor being acidulated with hydrochloric acid. In this manner the pectins prepared have comparable pH values (as measured on their water solutions) and for this reason are truly comparable.

It appears that the use of more than about 6.5 ml. of $NH_4OH$ per 100 grams of peel in the manner described hereinabove degrades the pectin. Apparently, from 5 ml. to slightly less than 6 ml. of $NH_4OH$ per 100 grams of peel produced the best results.

Previously extracted and precipitated solid pectin may be treated in a similar manner. The following tabulation indicates the results that may be obtained by the use of various alkalies in 70% alcohol. The solid pectin treated originally had a setting time of 45 seconds.

Table I

| Alkali | | Storage | | Time of set of jelly at 220 grade | |
|---|---|---|---|---|---|
| Kind | Amount (ml.) | Time (hr.) | Temp. | Min. | Sec. |
| | | | °C. | | |
| 7.5 N $NH_4OH$. | 2.4 | 16 | 29 | 1 | 12 |
| | 3.2 | 16 | 20 | 4 | 45 |
| 0.5 N KOH in 95% ethyl alcohol. | 20.0 | 16 | 29 | 1 | 10 |
| | 28.0 | 16 | 29 | 1 | 40 |
| | 37.0 | 16 | 29 | 4 | 15 |
| Crystals of $NH_4HCO_3$. | 2.0 g. | 16 | 29 | 1 | 30 |
| | 4.0 g. | 16 | 29 | 3 | 45 |
| Triethanolamine (50% sol.). | 20.0 | 16 | 30 | 2 | 30 |

In each instance the amount of alkali is expressed in milliliters per 100 milliliters of the ethyl alcohol used as a carrier except in the case of the $NH_4HCO_3$. Solid pectin was covered with between 4 and 5 times its weight of alkalized reagent. Attention is called to the fact that the original setting time of 45 seconds was increased to over 4 minutes by a storage treatment of not more than 16 hours at normal atmospheric temperatures. Table I also shows that by increasing the concentration of alkali present, the degree of retardation in setting time is enhanced. The pectins treated in the above example were also subjected to an acidified alcohol rinse for the purpose of neutralizing any residual alkalinity.

In another series the pectin treated had a normal time of set of 2 minutes. By subjecting this pectin to a 16 hour treatment at 25° C. in 70% ethyl alcohol to which 2 ml. of 15 normal $NH_4OH$ had been added per 100 ml. of alcohol, the time of set was increased to 6 minutes and 40 seconds. By using 2 ml. of pyridine in 100 ml. of benzene under the same time and temperature conditions, the time of set had increased to 2 minutes and 5 seconds. By increasing the pyridine addition to 10 ml. per 100 ml. of benzene, no additional retardation was obtained although at higher concentrations of pyridine a further retardation was exhibited.

The amount of increase in setting time which may be obtained within a given storage time and with a given alkalized reagent appears to be increased by the use of higher temperature during storage. For example, when a pectin having an original setting time of 45 seconds was treated in accordance with this invention at 25° C., the setting time was increased to 2 minutes and 23 seconds. When the storage was at 35° C., the setting time was increased to 4 minutes and 24 seconds and when the storage was carried out at 45° C., the setting time of the pectin was increased to 9 minutes. In all instances the reagent was the same, namely 3 ml. of 7.5 normal $NH_4OH$ per 100 ml. of 70% ethyl alcohol.

It appears desirable not to increase the pH of the alkalized reagent used in the treatment of previously extracted solid pectins to above about 9.5 as at higher pH the grade and gelation characteristics of the pectin appear to be impaired. Moreover, when alcohol is used it appears desirable to use alcohol of about 65% to 95% concentration as 98 alcohol is not as effective in retarding the set (alkali content and time of treatment being constant) whereas more dilute alkalized alcohol solutions have a tendency to hydrate the pectin and render the handling thereof more difficult.

Pectin sols may be treated in very much the same manner as solid pectins described hereinabove. For example, a 1½% pectin sol made from pectin having an original time of set of 1 minute and 20 seconds was stored for 22 hours at 36°. The pectin sol had an original pH of 3.53. Enough half normal $NH_4OH$ was added to increase the pH to 5.30 (glass electrode, 22° C.). At the expiration of the storage time above indicated the sol was neutralized with half normal hydrochloric acid added in quantity sufficient to neutralize the added ammonia and the pectin precipitated from the sol with alcohol. Whereas pectin from the untreated sol had a time of set of about 1 minute and 20 seconds, that from the treated sol had a setting time of 5 minutes.

The use of ammonium hydroxide in quantity sufficient to produce a pH of up to 8.75 resulted in pectins having setting times as long as 25 to 37 minutes but it appears that the texture of the resulting jellies is impaired when the pH of the sol (during the storage treatment) is maintained at above 6.5 or 7. It is to be remembered that the pH of the untreated sol referred to in the example was 3.53 and that most pectin sols have a pH of less than 4.

Although the conditions of temperature and time and alkali concentration appear to affect the rapidity of alteration or the extent to which the setting time of the pectin is altered, the fineness of division of the solid pectin being treated plays but a secondary part. It is not necessary that the solid pectin be finely divided. Relatively coarse pectin in the form of flakes or in the fibrous condition that it assumes upon precipitation with alcohol may be treated approximately as effectively as a solid pectin disintegrated sufficiently to pass through a 60 mesh sieve. After a previously extracted solid pectin has been treated in the manner described hereinabove, it may be washed or rinsed with fresh alcohol or other suitable solvent, and then dried. The wash liquid used may contain a buffer salt or an acid for the purpose of neutralizing any residual alkalinity. The removal of the residual alkalinity of an alcohol-acid rinse stabilizes the pectin and stops any appreciable alteration in the setting time. After such washing, the pectin may be dried in any suitable manner and if necessary reduced to the desired state of division.

It will be evident from the description given hereinabove that a process has been disclosed which permits the alteration of the setting time of pectin at will. This invention is further characerized by its evident departure from common practices. Heretofore it has been contended by those familiar with the industry that by treating pectin with an alkaline reagent in any manner, the jelly grade or jellifying power of the substance would be ruined. The present invention definitely shows that this is not necessarily the case and that it is possible to select conditions which will result in a material alteration in the setting time of the pectin without appreciable change in its jelly grade or other properties.

The invention is not to be limited to the specific ingredients or reagents referred to hereinabove for illustrative purposes. All changes, modifications, adaptations, uses and equipments coming within the scope of the appended claims are embraced thereby.

I claim:

1. A method of increasing the normal intrinsic setting time of pectin which comprises: subjecting pectin in the form of discrete particles of solid previously extracted pectin to the action of a basic reagent for a period of time and at a temperature and under conditions of pH insufficient to exert an appreciable dispersing and solvent effect on the pectin and insufficient to destroy the gelation characteristics of the pectin but sufficient to materially alter the intrinsic setting time thereof.

2. A method of increasing the normal, intrinsic setting time of pectin which comprises: subjecting pectinous material to the action of a basic reagent for a period of time and at a temperature and under conditions of pH insufficient to destroy the gelation characteristics of the pectin but sufficient to materially increase the intrinsic setting time thereof.

3. A method of increasing the normal, intrinsic setting time of pectin which comprises: subjecting pectinous material in the naturally occurring form to the action of a basic reagent for a period of time and at a temperature and under conditions of pH insufficient to destroy the gelation characteristics of the pectin but sufficient to materially increase the intrinsic setting time thereof.

4. A method of increasing the normal intrinsic setting time of pectin which comprises: subjecting pectin in the form of discrete particles of solid previously extracted pectin to the action of a basic reagent for a period of time and at a temperature and under conditions of pH insufficient to destroy the gelation characteristics of the pectin but sufficient to materially increase the intrinsic setting time thereof.

5. A method of increasing the normal intrinsic setting time of pectin which comprises: subjecting pectin sol to the action of a basic reagent for a period of time and at a temperature and under conditions of pH insufficient to destroy the gelation characteristics of the pectin but sufficient to materially increase the intrinsic setting time thereof.

6. A method of increasing the normal intrinsic setting time of pectin which comprises: subjecting pectinous material to the action of an alkalized liquid medium incapable of dissolving and hydrating the pectin to any appreciable extent for a period of time and at a temperature and under conditions of pH insufficient to destroy the gelation characteristics of the pectin but sufficient to materially increase the intrinsic setting time thereof.

7. A method of increasing the normal intrinsic setting time of pectin which comprises: subjecting pectinous material to the action of a basic reagent for a period of time of not less than about four hours and at a temperature and under conditions of pH insufficient to destroy the gelation characteristics of the pectin but sufficient to materially increase the intrinsic setting time thereof.

RAYMOND E. COX.